(12) United States Patent
Dedrick

(10) Patent No.: US 6,708,964 B1
(45) Date of Patent: Mar. 23, 2004

(54) ANY ANGLE MAGNETIC WELDING CLAMP ASSEMBLY

(76) Inventor: Ted Dedrick, 14135 Campo Rd., Jamul, CA (US) 91935

( * ) Notice: Subject to any disclaimer, the term of this patent is extended or adjusted under 35 U.S.C. 154(b) by 0 days.

(21) Appl. No.: 10/277,271

(22) Filed: Oct. 22, 2002

(51) Int. Cl.[7] .............................. B25D 11/00
(52) U.S. Cl. .................. 269/8; 269/37; 269/45
(58) Field of Search ...................... 294/65.5; 269/8, 269/276, 45, 37; 248/206.5, 309.4

(56) References Cited

U.S. PATENT DOCUMENTS

| | | | | |
|---|---|---|---|---|
| 1,828,791 A | * | 10/1931 | Thompson | 269/8 |
| 2,379,136 A | * | 6/1945 | Erwin et al. | 269/8 |
| 2,887,974 A | * | 5/1959 | Weinfeld | 269/45 |
| 5,398,176 A | * | 3/1995 | Ahuja | 362/253 |
| 5,971,379 A | * | 10/1999 | Leon, Jr. | 269/8 |
| 6,499,851 B1 | * | 12/2002 | Kelly et al. | 359/850 |
| 6,520,495 B1 | * | 2/2003 | La Mendola | 269/45 |

* cited by examiner

*Primary Examiner*—Robert C. Watson
(74) *Attorney, Agent, or Firm*—Charles C. Logan, II

(57) ABSTRACT

A welding clamp assembly having a magnet unit attached to the opposite ends of a flexible metal cable. The metal cable has a memory such as inherent in the structure of a microphone-type of cable. The welding clamp assembly allows metal members to be oriented together at various angles and eyeballed by the sculpture welder prior to welding them together. The metal members to be welded together may be plate, tube, and/or various configurations.

12 Claims, 1 Drawing Sheet

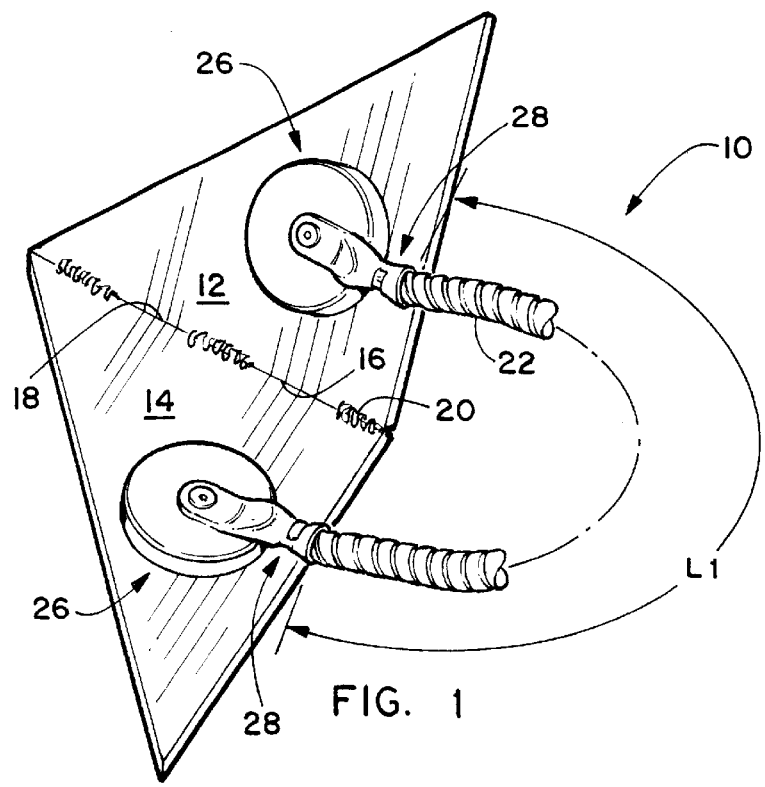
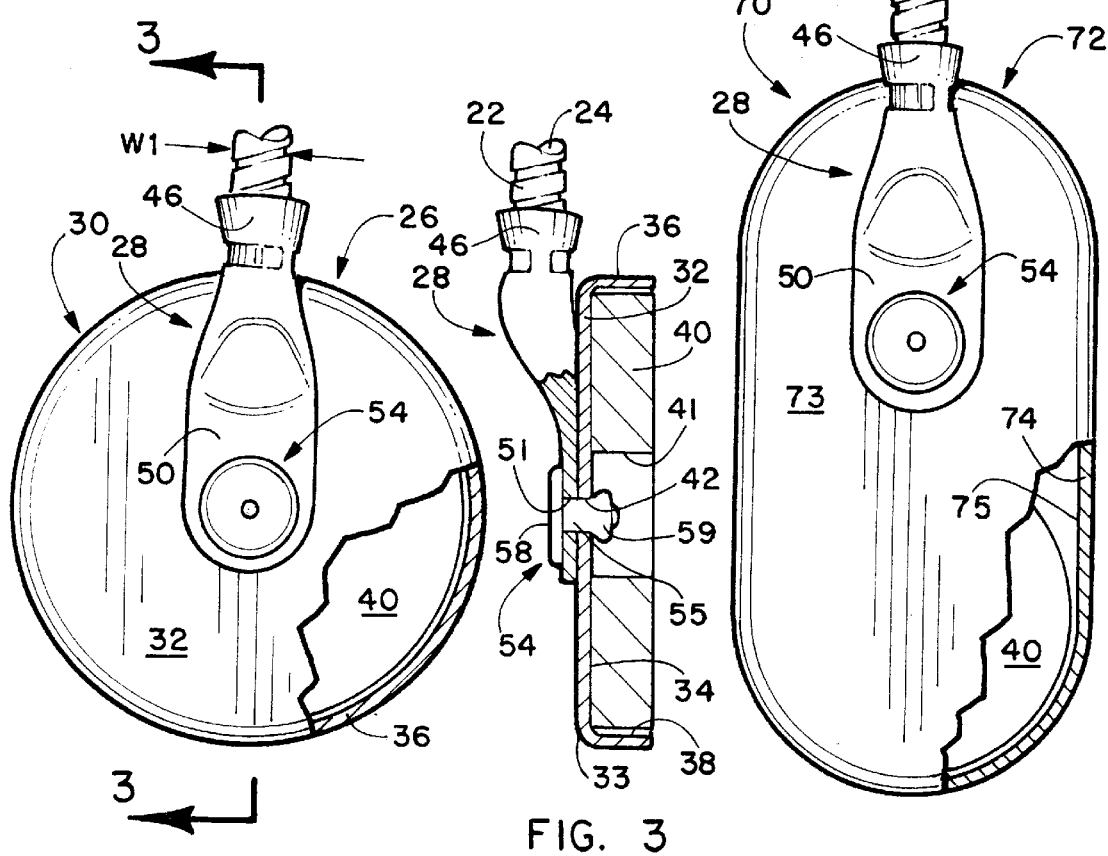
FIG. 1
FIG. 2
FIG. 3
FIG. 4

ANY ANGLE MAGNETIC WELDING CLAMP ASSEMBLY

BACKGROUND OF THE INVENTION

The invention relates to a welding clamp assembly and more specifically one that is utilized for sculptural welding or structural welding where the two metal members being joined are oriented at angles other than 45 degrees or 90 degrees.

There are prior art welding clamp assemblies that allow metal structural members to be positioned with their lateral edges oriented to each other at 45 degrees and 90 degrees. If the metal members are to be oriented to each other at various other angles, the sculpture welder has to position the metal members at a desired angle to each other and tack weld them in order to maintain the desired angle. You may then eyeball the orientation of the two members and decide if this is the orientation that he desires. If this is the orientation he wants, he will permanently connect them together with a bead weld. If the sculpture welder is not satisfied with their orientation, he must either break or melt the spot welding and start the process over again. This repositioning and spot welding may be required many times.

It is an object of the invention to provide a novel welding clamp assembly that can position adjacent parts together and also hold them in position at various angles other than 45 degrees, 90 degrees, or 180 degrees.

It is also an object of the invention to provide a novel welding clamp assembly that prior to welding allows adjacent parts to be eyeballed in various positions without needing to tack weld them together.

It is another object of the invention to provide a novel welding clamp assembly that is easy to use.

It is an additional object of the invention to provide a novel welding clamp that is economical to manufacture and market.

It is a further object of the invention to provide a novel welding clamp assembly that is ideal for sculptural welding.

SUMMARY OF THE INVENTION

The Any Angle Magnetic Welding Clamp Assembly has a flexible metal cable with a magnetic unit secured to each of its opposite ends. The metal cable is preferably of the microphone-type cable that allows the cable to be bent in various curvatures that are self maintained without assistance from other structure. In effect, the cable has a memory. This is extremely important when doing free form sculptural welding or if the welder is trying to fit a piece to an existing piece at an odd angle. This allows the welder to align two parts with respect to each other prior to welding or spot welding and eyeball the orientation of the two metal members to see if the welder is satisfied with their positioning. The welder can change the orientation multiple times by merely twisting the metal cable as necessary and its memory will hold the two metal pieces in different angular orientations to each other. A sculpture welder could use multiple Any Angle Magnetic Welding Clamp Assemblies to assemble multiple parts for visual purposes prior to welding in place. The metal members to be welded together can be plate members, tubular members, etc.

The magnets are preferably ceramic magnets, although other types of magnets can be used. The flanges on the housing or shell of the magnet units protect the fragile ceramic magnets.

DESCRIPTION OF THE DRAWING

FIG. 1 is a front perspective view illustrating how the Any Angle Magnetic Welding Clamp Assembly is utilized to clamp metal members together prior to welding them;

FIG. 2 is a front elevation view of one of the magnet units with a portion broken away;

FIG. 3 is a cross sectional view taken along lines 3—3 of FIG. 2; and

FIG. 4 is a front elevation view of an alternative embodiment of the magnetic unit.

DESCRIPTION OF THE PREFERRED EMBODIMENT

The Any Angle Magnetic Welding Clamp Assembly is generally designated numeral 10 and will be best understood by referring to FIGS. 1–3 of the drawing. Clamp assembly 10 is shown holding metal plates 12 and 14 together at an obtuse angle. Their respective lateral edges 16 and 18 contact each other and are secured in position by a bead weld 20.

Clamp assembly 10 has three major components. They are flexible metal cable 22 and the two magnetic units 26. Metal cable 22 has a memory similar to that found in a microphone-type of cable. It can be bent in various curved configurations and once released will remain in that same curved configuration. Metal cable 22 has a length L1 in the range of 2–36 inches. It also has a width W1 in the range of ¼–1 inch. Metal cable 22 is tubular and has a bore 24.

Magnet units 26 each have a shell or housing 30 having a front wall 32 that has a front surface 33 and a rear surface 34. Extending rearwardly from the peripheral edges of front wall 32 is an annular flange 36 that forms an interior chamber 38. A magnet 40 is secured in chamber 38 and it has a central bore hole 41. Front wall 32 has a central aperture 42. In the preferred embodiment, ceramic magnets would be used. It is to be understood that other types of magnets could also be utilized.

Connector member 28 has a tubular end portion 46 having a bore hole 47 that telescopically receives one end of metal cable 22. Once positioned therein the outer surface of tubular end portion 46 is crimped to secure the two members together. Connector 28 also has a flat rear end portion 50 having an aperture 51 that aligns with aperture 42. A rivet 54 secures connector 28 to housing 30. Rivet 54 has a shank portion 55 having a head 58 formed on its one end and a bulge 59 formed on its other end.

An alternative embodiment of a magnet unit is illustrated in FIG. 4 and it is designated numeral 70. It has an oblong shaped housing 72 having a front wall 73 and an annular flange 74 that forms a chamber 75 therein. A plurality of magnets 40 are secured in chamber 75. This embodiment of the magnetic unit would also be secured to the opposite ends of the connector 28 in the same manner as illustrated and discussed with FIGS. 2 and 3.

What is claimed is:

1. An any angle magnetic welding clamp assembly comprising:

an elongated flexible cable having a first end and a second end, a length L1 and a width W1;

said cable having memory means for allowing said cable to be bent in various curvatures that are self-maintained without assistance from other structure;

a first magnet unit and a second magnet unit; said first and second magnet units each have a housing having a front wall having a predetermined peripheral shape and a peripheral flange extends rearwardly from said front wall to form a chamber; at least one magnet is secured in said chamber; said magnets each have a substantially flat front surface and a substantially flat rear surface; said magnets have a circular shape with a central bore that extends between said front surface and said rear surface of at least one of said magnets;

first connecting means connecting said first magnet unit to said first end of said of said cable; and second connecting means connecting said second magnet unit to said second end of said cable.

2. An any angle magnetic welding clamp assembly as recited in claim 1 wherein said cable is made of metal material.

3. An any angle magnetic welding clamp assembly as recited in claim 1 wherein the structure of said cable is that of a microphone-type of cable.

4. An any angle magnetic welding clamp assembly as recited in claim 3 wherein L1 is in the range of 2 inches–36 inches.

5. An any angle magnetic welding clamp assembly as recited in claim 4 wherein W1 is in the range of ¼ inch–1 inch.

6. An any angle magnetic welding clamp assembly as recited in claim 1 wherein said housings of said first and second units have a circular shape.

7. An any angle magnetic welding clamp assembly comprising:

an elongated flexible cable having a first end and a second end, a length L1 and a width W1;

said cable having memory means for allowing said cable to be bent in various curvatures that are self-maintained without assistance from other structure;

a first magnet unit and a second magnet unit; said first and second magnet units each have a housing having a front wall having a predetermined peripheral shape and a peripheral flange extends rearwardly from said front wall to form a chamber; at least one magnet is secured in said chamber; said housing of said first and second units have an oblong shape;

first connecting means connecting said first magnet unit to said first end of said of said cable; and second connecting means connecting said second magnet unit to said second end of said cable.

8. An any angle magnetic clamp assembly as recited in claim 7 wherein said cable is tubular.

9. An any angle magnetic welding clamp assembly comprising:

an elongated flexible cable having a first end and a second end, a length L1 and a width W1; said cable is tubular;

said cable having memory means for allowing said cable to be bent in various curvatures that are self maintained without assistance from other structure;

a first magnet unit and a second magnet unit;

first connecting means connecting said first magnet to said first end of said cable; said first connecting means comprises an elongated first connector having a tubular front end portion and a flat rear end portion; said first end of said cable is telescopically received and secured in said tubular front end portion of said first connector; said flat rear end portion of said first connector is secured to said first magnet unit by first fastening means; and second connecting means connecting said second magnet unit to said second end of said cable.

10. An any angle magnetic welding clamp assembly as recited in claim 9 wherein said second connecting means comprises an elongated second connector having a tubular front end portion and a flat rear end portion; said second end of said cable is telescopically received and secured in said tubular front end portion of said second connector; said flat rear end portion of said second connector is secured to said second magnet unit by second fastening means.

11. An any angle magnetic welding clamp assembly as recited in claim 9 wherein said first fastening means is a metal rivet.

12. An any angle magnetic welding clamp assembly as recited in claim 10 wherein said second fastening means is a metal rivet.

* * * * *